United States Patent
Wang et al.

(10) Patent No.: US 7,855,772 B2
(45) Date of Patent: Dec. 21, 2010

(54) FRINGE FIELD SWITCHING MODE LIQUID CRYSTAL DISPLAY DEVICE WITH HIGH TRANSMITTANCE AND WIDE VIEWING ANGLE

(75) Inventors: Chun-Yu Wang, Miao-Li (TW);
Yu-Cheng Lin, Miao-Li (TW);
Chueh-Ju Chen, Miao-Li (TW);
Chiu-Lien Yang, Miao-Li (TW);
Jia-Pang Pang, Miao-Li (TW)

(73) Assignee: Chimei Innolux Corporation, Miao-Li County (TW)

( * ) Notice: Subject to any disclaimer, the term of this patent is extended or adjusted under 35 U.S.C. 154(b) by 221 days.

(21) Appl. No.: 12/002,448

(22) Filed: Dec. 17, 2007

(65) Prior Publication Data
US 2008/0143946 A1    Jun. 19, 2008

(30) Foreign Application Priority Data
Dec. 15, 2006    (TW)    ............................. 95147245 A (51) Int. Cl.
*G02F 1/1343* (2006.01)
(52) U.S. Cl. .................. 349/144; 349/141; 349/142; 349/143
(58) Field of Classification Search .......... 349/141–144
See application file for complete search history.

(56) References Cited

U.S. PATENT DOCUMENTS

| 6,580,487 | B1 | 6/2003 | Kim et al. | |
|---|---|---|---|---|
| 6,721,028 | B2 | 4/2004 | Kim et al. | |
| 7,623,190 | B2 * | 11/2009 | Kim et al. | 349/39 |
| 2002/0041354 | A1 * | 4/2002 | Noh et al. | 349/141 |
| 2002/0180920 | A1 * | 12/2002 | Noh et al. | 349/141 |
| 2007/0002217 | A1 * | 1/2007 | Chang et al. | 349/98 |

FOREIGN PATENT DOCUMENTS

KR    2005023084    *    3/2005

* cited by examiner

*Primary Examiner*—Hoan C Nguyen
(74) *Attorney, Agent, or Firm*—Wei Te Chung (57) ABSTRACT

An exemplary fringe field switching liquid crystal display device (3) includes a first substrate (310) and a second substrate (320) disposed parallel to each other and spaced apart a predetermined distance. A liquid crystal layer (300) is interposed between the first and second substrates. A plurality of gate lines (332) and data lines (331) are formed on the second substrate, thereby defining a plurality of pixel regions. A common electrode (321) is arranged in each pixel region. And a pixel electrode (323) is arranged in each pixel region and insulated from the common electrode, the pixel electrode including a plurality of slits (350) arranged therein. The slits are separate from each other and maintain varied angles including oblique angles relative to the nearest gate lines.

20 Claims, 7 Drawing Sheets

FRINGE FIELD SWITCHING MODE LIQUID CRYSTAL DISPLAY DEVICE WITH HIGH TRANSMITTANCE AND WIDE VIEWING ANGLE

FIELD OF THE INVENTION

The present invention relates to liquid crystal display (LCD) devices, and particularly to a fringe field switching (FFS) mode LCD device with high transmittance and a wide viewing angle.

BACKGROUND

LCD devices are used as displays on a variety of electronic products, such as computer monitors and motor vehicle cruise control panels. Existing LCD types include, for example, the twisted nematic liquid crystal display (TN-LCD) and the in-plane switching liquid crystal display (IPS-LCD). The TN-LCD often has the problem of a narrow viewing angle, and so the IPS-LCD was developed to overcome this disadvantage. The IPS-LCD typically has one or more common electrodes and a plurality of pixel electrodes all disposed on one of two parallel substrates. Liquid crystal molecules are interposed between the substrates. The electrodes drive the liquid crystal molecules with an electric field. The resulting electric field is substantially in a plane parallel to the substrates. Such a configuration provides a wide viewing angle.

However, the common electrodes and pixel electrodes are formed of opaque metals, giving the IPS-LCD a low aperture ratio and low transmittance. Thus, a fringe field switching liquid crystal display (FFS-LCD) with a flat plate-like common electrode has been developed in order to improve on the aperture ratio and transmittance. The FFS-LCD is characterized by its driving electric field, which is between each pixel electrode and the common electrode. Because the common electrode is transparent, the FFS-LCD can typically attain a higher aperture ratio and a higher transmittance.

Figure 7:
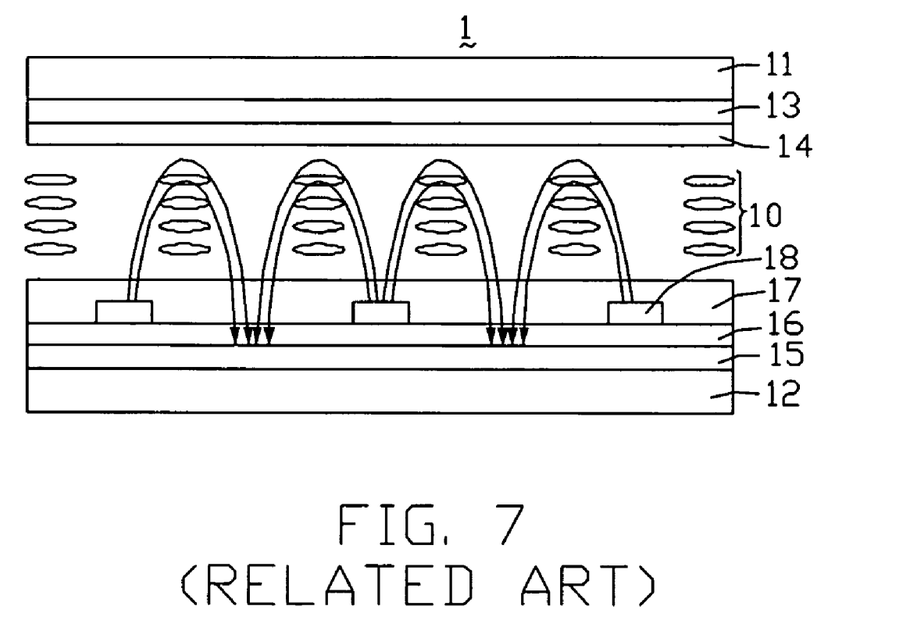
FIG. 7 is a side cross-sectional view of part of a conventional FFS-LCD device.

FIG. 7 is a schematic, side cross-sectional view of part of a typical FFS-LCD device. The FFS-LCD device 1 includes a first substrate 11 and a second substrate 12, with the first and second substrates 11, 12 being spaced apart a predetermined distance. A liquid crystal layer 10 having a multiplicity of liquid crystal molecules (not labeled) is disposed between the first and second substrates 11, 12. A backlight module (not shown) is disposed under the second substrate 12 for providing illumination.

A color filter 13 and a first alignment film 14 are formed on an inner surface of the first substrate 11, in that order from top to bottom. A common electrode 15 and a plurality of pixel electrodes 18 are disposed at an inner surface of the second substrate 12, with an insulating layer 16 interposed between the common electrode 15 and the pixel electrodes 18. A second alignment film 17 is formed on the insulating layer 16, such that the second alignment film 17 also covers the pixel electrodes 18.

Figure 8:
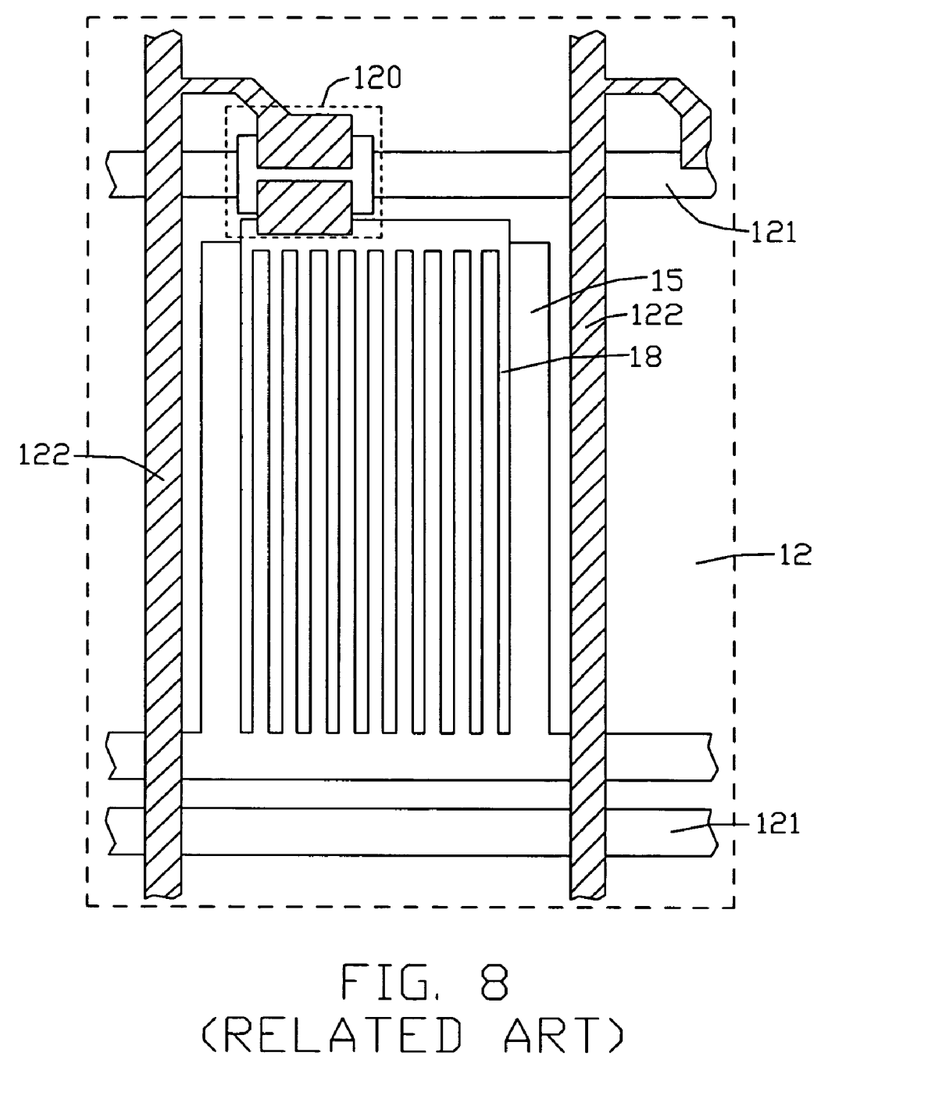
FIG. 8 is a top plan view of a pixel region of the FFS-LCD device of FIG. 7.

Also referring to FIG. 8, this is a top plan view of part of the second substrate 12. Two gate lines 121 and two data lines 122 define a pixel region of the FFS-LCD device 1. The data lines 122 are parallel to but spaced apart from each other, and are substantially perpendicular to the gate lines 121. A thin film transistor (TFT) 120 used as a switching element is arranged at the intersection of one gate line 121 and the corresponding data line 122.

The pixel and common electrodes 18, 15 are formed in the pixel region. The pixel and common electrodes 18, 15 are made of a transparent conductive material such as indium-tin-oxide (ITO) or indium-zinc-oxide (IZO). The pixel electrode 18 is electrically connected to the source electrode of the TFT 120, in order to obtain displaying signals therefrom. The common electrode 15 is electrically connected to common line (not labeled), in order to obtain common voltage signals therefrom.

The pixel electrode 18 includes a plurality of straight comb tooth portions (not labeled), which all extend in a same direction and are substantially parallel to each other. When the FFS-LCD device 1 is driven, a strong fringe electric field is formed between the common electrode 15 and the pixel electrode 18. The liquid crystal molecules disposed over the common electrode 15 and pixel electrodes 18 are driven by this electric field to have a corresponding orientation. The liquid crystal molecules are rotated only in a single direction; that is, the FFS-LCD device 1 has a single domain. Consequently, the FFS-LCD device 1 has a high aperture ratio and high transmittance; but the FFS-LCD device 1 also exhibits color shift when it is obliquely viewed in different directions.

Figure 9:
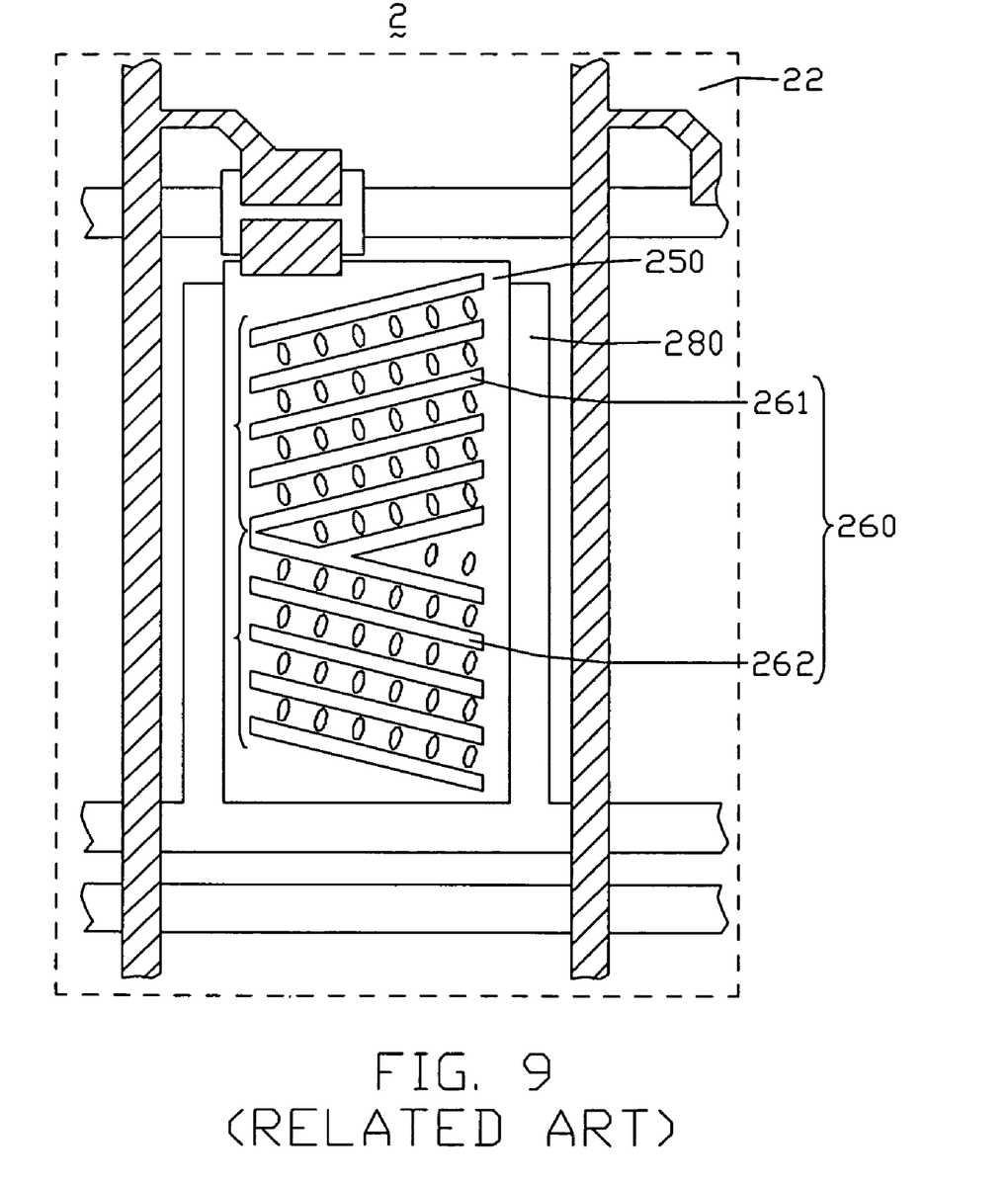
FIG. 9 is a top plan view of a pixel region of another conventional FFS-LCD device.

Referring to FIG. 9, this is a schematic, top plan view of a pixel region of another typical FFS-LCD device. The FFS-LCD device 2 has a structure similar to that of the FFS-LCD device 1. However, a pixel electrode 250 has a plurality of slits 260 therein. The slits 260 are divided into a first set of slits 261 and a second set of slits 262. The first set of slits 261 are parallel to each other and oriented in a first direction. The second set of the slits 262 are parallel to each other and oriented in a second direction. Thus, at the center of the pixel electrode 250, the first set and second sets of slits 261, 262 cross and form some "V"-shaped (or "Y"-shaped) elbows thereat. When a voltage is applied between the pixel and common electrodes 250, 280, a horizontal in-plane electric field in two directions is established between the pixel and common electrodes 250, 280. Thus, the liquid crystal display device 2 has two domains so as to reduce color shift.

However, at each "V"-shaped elbow portion, an electric field generated by voltage is abnormal, and liquid crystal molecules thereat are oriented disorderly. Further, disinclination of the liquid crystal molecules occurs at the elbow portion, and this decreases the transmittance and display quality of the LCD device 2.

Accordingly, what is needed is an FFS-LCD device that can overcome the above-described deficiencies.

SUMMARY

An exemplary fringe field switching liquid crystal display device includes a first substrate and a second substrate disposed parallel to each other and spaced apart a predetermined distance. A liquid crystal layer is interposed between the first and second substrates. A plurality of gate lines and data lines are formed on the second substrate, thereby defining a plurality of pixel regions. A common electrode (321) is arranged in each pixel region. And a pixel electrode (323) is arranged in each pixel region and insulated from the common electrode, the pixel electrode including a plurality of slits (350) arranged therein. The slits are separate from each other and maintain varied angles including oblique angles relative to the nearest gate lines.

Another exemplary fringe field switching liquid crystal display device includes a first substrate and a second substrate disposed parallel to each other and spaced apart a predetermined distance. A liquid crystal layer is interposed between the first and second substrates. A plurality of gate lines and data lines are formed on the second substrate, thereby defining a plurality of pixel regions. A common electrode is arranged in each pixel region. And a pixel electrode is arranged on and insulated from the common electrode. The pixel electrode includes a central slit arranged at a center portion of the pixel electrode, and a plurality of side slits arranged at each of two opposite long sides of the central slit. All of the slits are separate from each other, and the side slits at each long side of the central slit have a varying oblique angles relative to the central slit.

Other novel features and advantages will become more apparent from the following detailed description when taken in conjunction with the accompanying drawings. In the drawings, all the views are schematic.

DETAILED DESCRIPTION OF PREFERRED EMBODIMENTS

Reference will now be made to the drawings to describe the present invention in detail.

Figure 1:
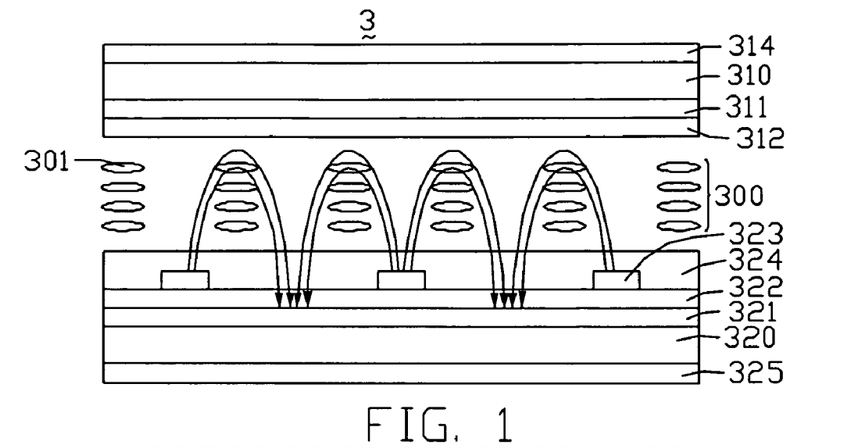
FIG. 1 is a side cross-sectional view of part of an FFS-LCD device according to a first embodiment of the present invention, shown when a voltage is applied thereto.

FIG. 1 is a schematic, side cross-sectional view of part of an FFS-LCD device 3 according to a first embodiment of the present invention, shown when a voltage is applied thereto. The FFS-LCD device 3 includes a first substrate 310, a second substrate 320 parallel to the first substrate 310 and spaced therefrom a predetermined distance, and a liquid crystal layer 300 sandwiched between the first and second substrates 310, 320. The liquid crystal layer 300 includes a multiplicity of liquid crystal molecules 301.

A first polarizer 314 is arranged on an outer surface of the first substrate 310. A color filter 311 is formed on an inner surface of the first substrate 310, and a first alignment layer 312 is formed on the color filter 311.

A second polarizer 325 is arranged on an outer surface of the second substrate 320. A common electrode 321, an insulating layer 322, a plurality of pixel electrodes 323, and a second alignment layer 324 are arranged on an inner surface of the second substrate 320 from bottom to top in that order. The liquid crystal layer 300 is sandwiched between the first and second alignment layers 312, 324.

Figure 2:
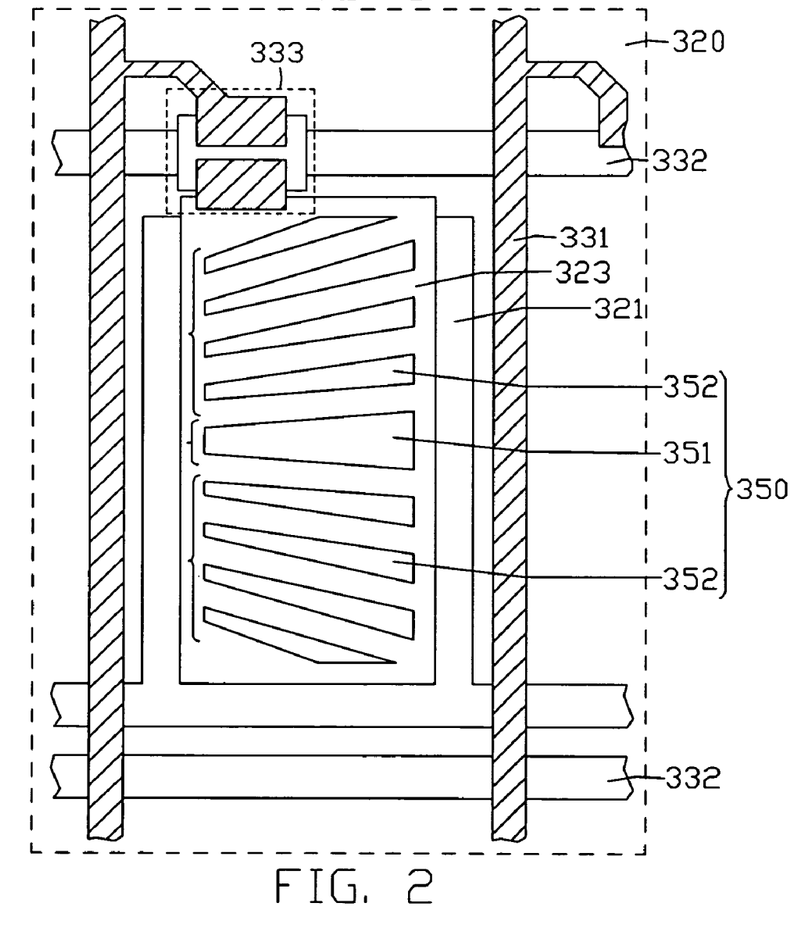
FIG. 2 is an enlarged, top plan view of a pixel region of the FFS-LCD device of FIG. 1.

Also referring to FIG. 2, this shows an enlarged, top plan view of part of the second substrate 320 of the FFS-LCD device 3. A plurality of data lines 331 and gate lines 332 are formed on the second substrate 320. The data lines 331 are arranged parallel to each other, and each data line 331 extends along a longitudinal direction. The gate lines 332 are arranged parallel to each other, and each gate line 332 extends along a direction transverse to the longitudinal direction of the data lines 331. Thus, the crossing data lines 331 and gate lines 332 cooperatively define a multiplicity of pixel regions (not labeled). The common electrode 321 and the pixel electrode 323 are in the pixel region. A thin film transistor (TFT) 333 used as a switching element is arranged at the intersection of one gate line 332 and the corresponding data line 331.

The gate line 332 is electrically connected to the gate electrode of the TFT 333 in order to provide scanning signals. The data line 331 is electrically connected to the source electrode of the TFT 333 in order to provide display signals thereto. The pixel electrode 323 is electrically connected to the drain electrode of the TFT 333 in order to receive display signals therefrom.

The pixel electrode 323 has a plate-like structure with a plurality of slits 350 therein. Each of the slits 350 has a quadrilateral shape. A centermost one of the slits 350 is an isosceles trapezoid slit 351, which is located at a center portion of the pixel electrode 323. All of two sets of slits 352 except two endmost of the two sets of slits 352 have a trapezoidal shape. The trapezoidal shape includes two parallel sides that are also parallel to the data lines 331, and two nonparallel sides that maintain oblique angles relative to the nearest gate line 332. The two sets of slits 352 are arranged in two sets, which are oriented symmetrically opposite to each other at two opposite sides of the isosceles trapezoid slit 351. Each of the two sets of slits 352 has a central longitudinal axis (not shown), which maintains a predetermined oblique angle relative to a central longitudinal axis (not shown) of the isosceles trapezoid slit 351. The oblique angles of the slits 352 in each set of slits 352 progressively increase from the slit 352 adjacent to the isosceles trapezoid slit 351 to the slit 352 farthest from the isosceles trapezoid slit 351. A distance separating any two adjacent slits 350 is uniform. That is, each long side of each slit 350 is parallel to the nearest long side of the nearest adjacent slit 350. Further, the distance separating all the adjacent slits 350 is a same distance. With this configuration, the slits 350 have a generally fan-shaped distribution or arrangement.

Figure 3:
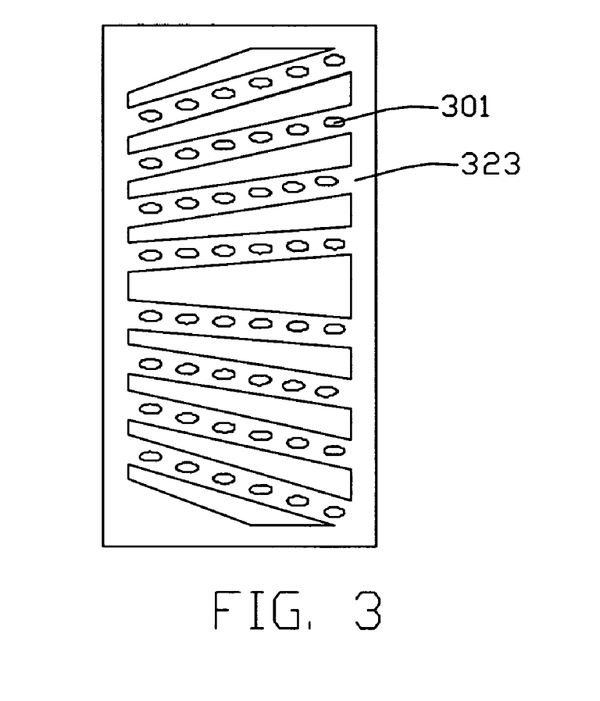
FIG. 3 is a view of a pixel electrode of the pixel region of FIG. 2, showing orientations of liquid crystal molecules when no voltage is applied to the pixel region.

Also referring to FIG. 3, the FFS-LCD device 3 is in an "off" state when no voltage is applied thereto. In this state, the liquid crystal molecules 301 contained in the liquid crystal layer 300 are aligned in a single direction, as induced by the alignment layers 312, 324.

Figure 4:
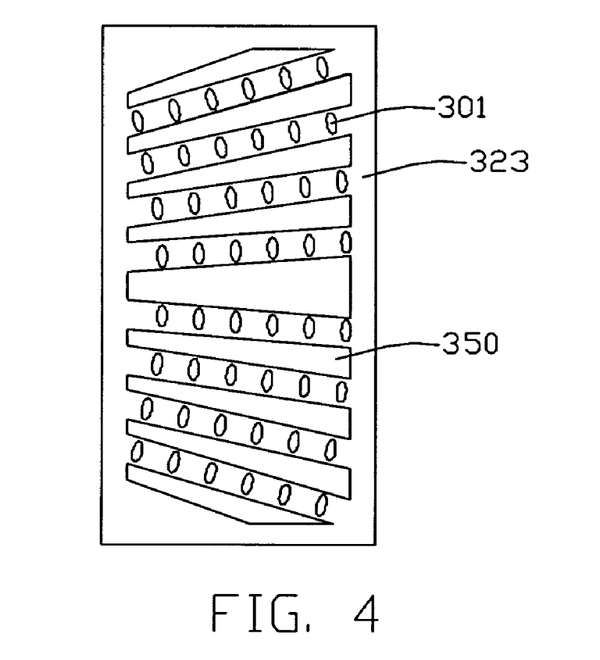
FIG. 4 is similar to FIG. 3, but showing changed orientations of the liquid crystal molecules when a voltage is applied to the pixel region.

Also referring to FIG. 4, the FFS-LCD device 3 is in an "on" state when a voltage is applied between the common electrode 321 and the pixel electrode 323. In this state, a horizontal electric field having different directions in the horizontal plane is established, owing to the various configurations of the slits 350 including the angles of the slits 350. The electric field is oriented in successive contiguous directions that continuously vary from each of the long sides of the isosceles trapezoid slit 351 to the corresponding endmost slit 352 farthest from the isosceles trapezoid slit 351. The electric field causes the liquid crystal molecules 301 to be twisted in the horizontal plane that is parallel to the substrates 310, 320. Because the electric field has various directions in the horizontal plane, the liquid crystal molecules 301 are twisted in various directions, and are arranged in a generally fan-shaped distribution corresponding to the fan-shaped distribution of the slits 350. Consequently, the FFS-LCD device 3 has a wide variety of domains.

As a result, when the FFS-LCD device 3 is in an "on" state, different colors can be seen in different regions from different directions corresponding to the continuous domains. Thereby, any color shift that may otherwise exist is reduced or even eliminated. That is, the FFS-LCD device 3 has a wide viewing angle. Furthermore, all of the slits 350 are separated from each other (see above), and no elbow portions exist in the pixel electrode 323. Therefore disinclination is prevented, and light transmittance of the TFT-LCD device 3 is enhanced as well.

Figure 5:
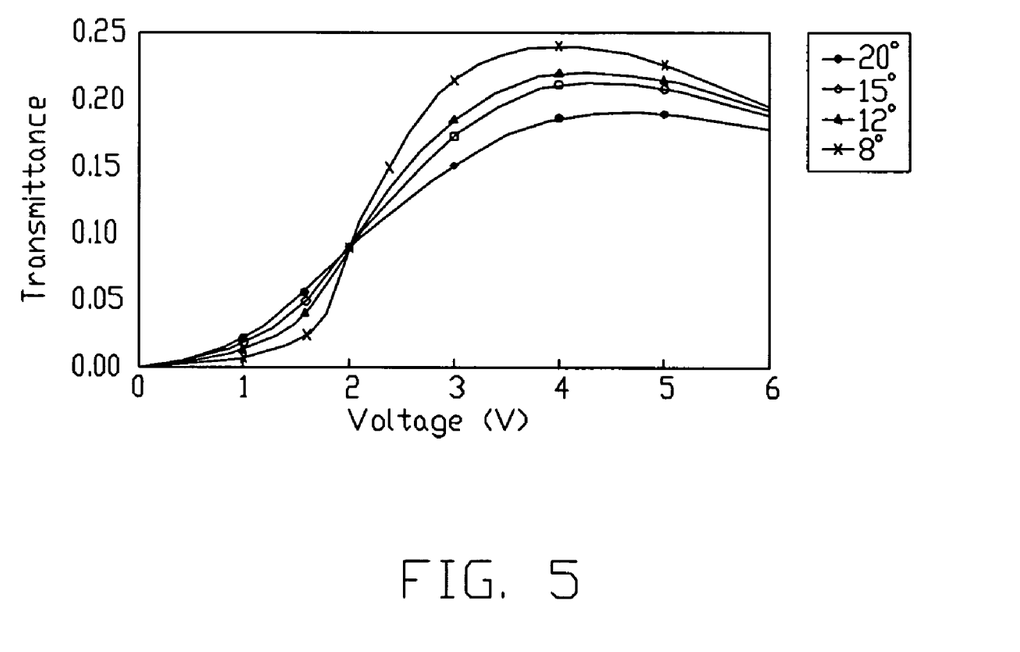
FIG. 5 shows Transmittance-Voltage curves for the FFS-LCD device of FIG. 1, the curves corresponding to different configurations of the pixel electrode whereby slits of the pixel electrode are oriented at different angles.

FIG. 5 illustrates transmittance-voltage (TV) curves of the FFS-LCD device 3 with slits 350 having varied oblique angles to the gate line 332. The four curves illustrate four typical TV curves with oblique angles of 8°, 12°, 15° and 20°. When a high driving voltage, e.g. 4 V, is applied between the common electrode 321 and the pixel electrode 323, the FFS-LCD device 3 is in "on" state. The oblique angles have remarkable influence to the transmittance of the FFS-LCD device 3. When the oblique angle is large, e.g. 20°, the FFS-LCD device 3 has a lower transmittance at the peak of the curve, and the transmittance smoothly varies when the driving voltage swings in a range. When the oblique angle is small, e.g. 12°, the FFS-LCD device 3 has a higher transmittance at the peak of the curve, and the transmittance steeply varies when the driving voltage swings in a range.

From the above description, when the FFS-LCD device 3 is in an "on" state, in order to obtain a high transmittance, the oblique angles of the slits 350 should be as small as practicable. However, in operation of the FFS-LCD device 3, the driving voltage typically swings across a range of voltages. For this reason, in order to achieve a stable transmittance for displaying images, the oblique angles of the slits 350 should be as large as practicable. Based on experimentation, it has been concluded that the preferred angles of the slits 350 are in a range of 0° to 20°. In this range, a high and stable transmittance is achieved as required.

Figure 6:
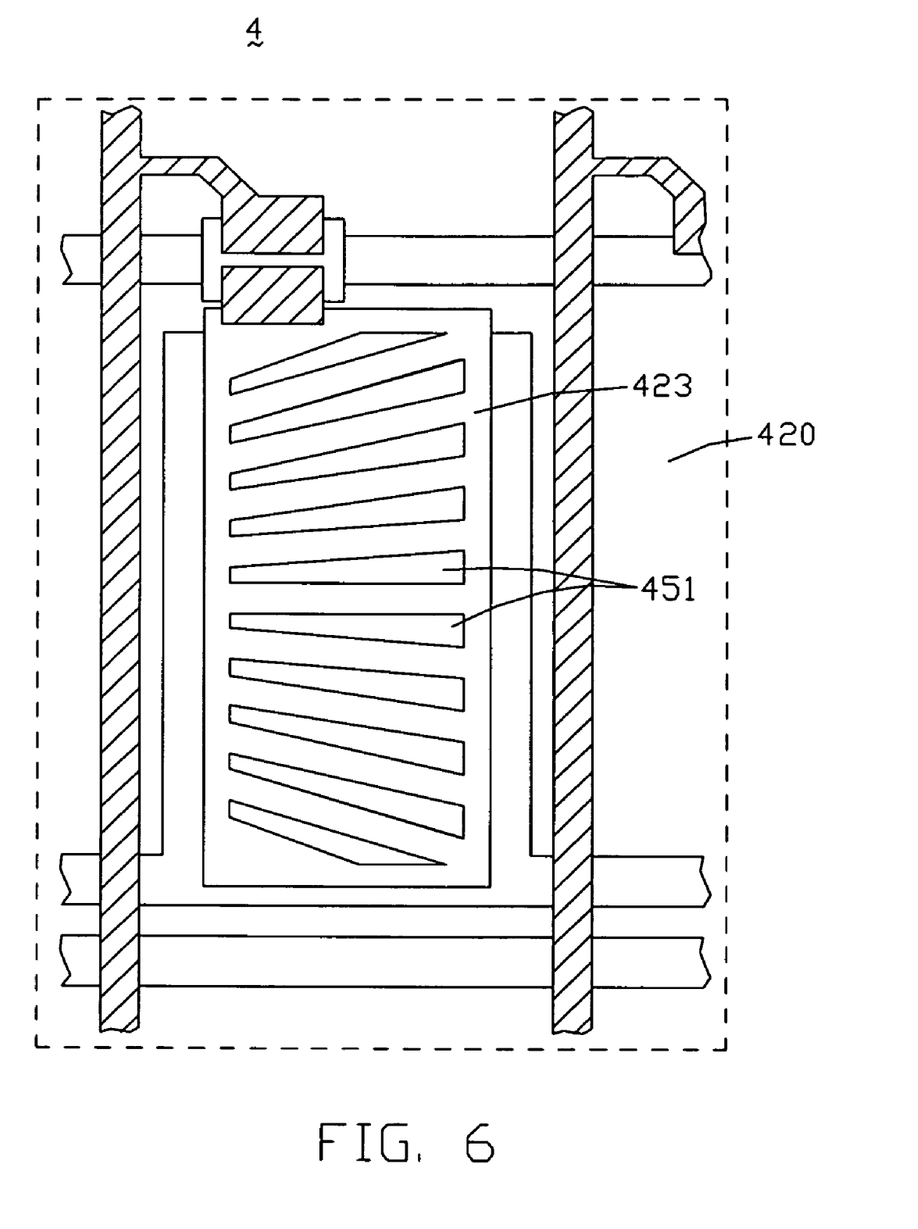
FIG. 6 is a top plan view of a pixel region of an FFS-LCD device according to a second embodiment of the present invention.

Referring to FIG. 6, this shows a top plan view of part of a second substrate 420 of an FFS-LCD device according to a second embodiment of the present invention. The FFS-LCD device 4 has a structure similar to the FFS-LCD device 3 of the first embodiment. However, in the FFS-LCD device 4, a pair of right-angled trapezoid slits 451 are arranged at a center portion of a pixel electrode 423. The two trapezoid slits 451 have two adjacent parallel long sides. For reasons similar to those detailed above in relation to the FFS-LCD device 3, the FFS-LCD device 4 can achieve high transmittance and a wide viewing angle.

It is to be understood, however, that even though numerous characteristics and advantages of the present embodiments have been set out in the foregoing description, together with details of the structures and functions of the embodiments, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A fringe field switching liquid crystal display device, comprising:
    a first substrate and a second substrate disposed parallel to each other and spaced apart a predetermined distance;
    a liquid crystal layer interposed between the first and second substrates;
    a plurality of gate lines and a plurality of data lines formed at the second substrate, thereby defining a plurality of pixel regions;
    a common electrode arranged in each pixel region; and
    a pixel electrode arranged in each pixel region and insulated from the common electrode, the pixel electrode comprising a plurality of slits defined therein;
    wherein the slits are separate from each other, the pixel electrode defines a central longitudinal axis thereof parallel to the gate lines, and the slits maintain gradually increased oblique angles relative to the central longitudinal axis in a sequence from a slit nearest the central longitudinal axis to a slit at one of two opposite ends of the pixel electrode, and also in a sequence from a slit nearest the central longitudinal axis to a slit at the other of the two opposite ends of the pixel electrode.

2. The fringe field switching liquid crystal display device as claimed in claim 1, wherein each of the slits comprises two opposite short sides and two opposite long sides.

3. The fringe field switching liquid crystal display device as claimed in claim 2, wherein two of the slits disposed at a center portion of the pixel electrode are two right-angled trapezoid slits, an inmost one of the long sides of each right-angled trapezoid slit is perpendicular to two adjacent short sides of the right-angled trapezoid slit, and the two right-angled trapezoid slits are oriented side by side with the inmost long sides thereof adjacent and parallel to each other.

4. The fringe field switching liquid crystal display device as claimed in claim 2, wherein one of the slits disposed at a center portion of the pixel electrode is an isosceles trapezoid slit.

5. The fringe field switching liquid crystal display device as claimed in claim 4, wherein the two opposite short sides of the isosceles trapezoid slit are parallel to the data lines, and the two opposite long sides of the isosceles trapezoid slit maintain oblique angles relative to the gate lines.

6. The fringe field switching liquid crystal display device as claimed in claim 4, wherein the other slits are disposed symmetrically at the two opposite long sides of the isosceles trapezoid slit.

7. The fringe field switching liquid crystal display device as claimed in claim 6, wherein the two opposite long sides of each of the other slits maintain different oblique angles relative to the gate lines.

8. The fringe field switching liquid crystal display device as claimed in claim 6, wherein the opposite long sides of the other slits maintain oblique angles relative to the gate lines.

9. The fringe field switching liquid crystal display device as claimed in claim 8, wherein for each two adjacent slits, a gap separating those two adjacent slits is a uniform gap.

10. The fringe field switching liquid crystal display device as claimed in claim 1, wherein the oblique angles of the slits are in a range of 0° to 20°.

11. The fringe field switching liquid crystal display device as claimed in claim 1, further comprising an insulating layer interposed between the pixel electrode and the common electrode.

12. The fringe field switching liquid crystal display device as claimed in claim 1, further comprising a first alignment layer arranged between the first substrate and the liquid crystal layer, a second alignment layer arranged between the second substrate and the liquid crystal display layer, a first polarizer arranged on an outer surface of the first substrate, and a second polarizer arranged on an outer surface of the second substrate.

13. A fringe field switching liquid crystal display device, comprising:
    a first substrate and a second substrate disposed parallel to each other and spaced apart a predetermined distance;

a liquid crystal layer interposed between the first and second substrates;

a plurality of gate lines and a plurality of data lines formed at the second substrate, thereby defining a plurality of pixel regions;

a common electrode arranged in each pixel region; and a pixel electrode arranged on and insulated from the common electrode;

wherein the pixel electrode comprises a central slit arranged at a center portion of the pixel electrode, and a plurality of side slits arranged at each of two opposite long sides of the central slit; and all of the slits are separate from each other, the side slits at one of the long sides of the central slit maintain continuously increased oblique angles relative to said one of the long sides of the central slit in a sequence from a side slit nearest to said one of the long sides of the central slit to a side slit at one of two opposite ends of the pixel electrode, and the side slits at the other long side of the central slit maintain continuously increased oblique angles relative to said other long side of the central slit in a sequence from a side slit nearest to said other long side of the central slit to a side slit at the other one of the two opposite ends of the pixel electrode.

14. The fringe field switching liquid crystal display device as claimed in claim 13, wherein the oblique angles of the slits are in a range of 0° to 20°.

15. A fringe field switching liquid crystal display device comprising:

a first substrate and a second substrate disposed parallel to each other and spaced apart a predetermined distance;

a liquid crystal layer interposed between the first and second substrates;

a plurality of gate lines and a plurality of data lines formed at the second substrate, thereby defining a plurality of pixel regions;

a common electrode arranged in each pixel region; and a pixel electrode arranged in each pixel region and insulated from the common electrode, the pixel electrode comprising a plurality of slits defined therein;

wherein the slits are separate from each other, each of the slits except two endmost slits is wedge-shaped with a narrow end and an opposite broad end, and the narrow ends of the slits except the two endmost slits point toward a same data line at one side of the pixel electrode.

16. The fringe field switching liquid crystal display device as claimed in claim 15, wherein a distance between every two adjacent slits is essentially constant.

17. The fringe field switching liquid crystal display device as claimed in claim 15, wherein the slits are arranged in a radiating manner from an imaginary center.

18. The fringe field switching liquid crystal display device as claimed in claim 17, wherein one of the slits disposed at a center portion of the pixel electrode is an isosceles trapezoid slit.

19. The fringe field switching liquid crystal display device as claimed in claim 17, wherein two of the slits disposed at a center portion of the pixel electrode are two right-angled trapezoid slits.

20. The fringe field switching liquid crystal display device as claimed in claim 19, wherein each of the two right-angled trapezoid slits comprises a long side perpendicular to two adjacent short sides, and the two right-angled trapezoid slits are oriented side by side with the long sides thereof adjacent and parallel to each other.

* * * * *